(12) United States Patent
Ma

(10) Patent No.: US 12,381,688 B2
(45) Date of Patent: Aug. 5, 2025

(54) METHOD AND APPARATUS FOR DETERMINING PDSCH RECEPTION BEAM, STORAGE MEDIUM, AND TERMINAL

(71) Applicant: BEIJING UNISOC COMMUNICATIONS TECHNOLOGY CO., LTD., Beijing (CN)

(72) Inventor: Dawei Ma, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 389 days.

(21) Appl. No.: 17/794,523

(22) PCT Filed: Mar. 19, 2021

(86) PCT No.: PCT/CN2021/081719
§ 371 (c)(1),
(2) Date: Jul. 21, 2022

(87) PCT Pub. No.: WO2021/148056
PCT Pub. Date: Jul. 29, 2021

(65) Prior Publication Data
US 2023/0140021 A1 May 4, 2023

(30) Foreign Application Priority Data
Jan. 22, 2020 (CN) .......................... 202010074010.5

(51) Int. Cl.
*H04L 5/00* (2006.01)
*H04W 72/044* (2023.01)
(Continued)

(52) U.S. Cl.
CPC .......... *H04L 5/0053* (2013.01); *H04L 5/0044* (2013.01); *H04W 72/0446* (2013.01);
(Continued)

(58) Field of Classification Search
None
See application file for complete search history.

(56) References Cited

U.S. PATENT DOCUMENTS

| 2020/0281001 A1 | 9/2020 | Zuo et al. |
| 2020/0288479 A1 | 9/2020 | Xi et al. |

(Continued)

FOREIGN PATENT DOCUMENTS

| CN | 109818723 A | 5/2019 |
| CN | 110351775 A | 10/2019 |

(Continued)

OTHER PUBLICATIONS

ZTE. "Simultaneous transmission and reception of different channels and reference signals" 3GPP TSG RAN WG1 Meeting #93 RI-1805830, May 25, 2018 (May 25, 2018), entire document.

(Continued)

*Primary Examiner* — Sujoy K Kundu
*Assistant Examiner* — Raul Rivas
(74) *Attorney, Agent, or Firm* — Harness, Dickey & Pierce, P.L.C.

(57) ABSTRACT

A method and an apparatus for determining a PDSCH reception beam, a storage medium, and a terminal are provided. The method includes: receiving one or more PDCCHs and determining a to-be-received PDSCH, wherein the to-be-received PDSCH is repeatedly scheduled by the one or more PDCCHs; determining a duration between a last symbol of the one or more PDCCHs which schedule the to-be-received PDSCH and a first symbol of the to-be-received PDSCH; using a first reception beam to receive the to-be-received PDSCH based on the duration being shorter than a preset duration; and using a second reception beam to receive the to-be-received PDSCH based on the duration being longer than or equal to the preset duration, wherein the first reception beam and the second reception beam are the same or different.

11 Claims, 5 Drawing Sheets

(51) Int. Cl.
*H04W 72/0446* (2023.01)
*H04W 72/23* (2023.01)
*H04W 76/15* (2018.01)

(52) U.S. Cl.
CPC ......... *H04W 72/046* (2013.01); *H04W 72/23* (2023.01); *H04W 76/15* (2018.02)

(56) References Cited

U.S. PATENT DOCUMENTS

| | | | |
|---|---|---|---|
| 2021/0409173 A1* | 12/2021 | Chatterjee | H04L 5/0053 |
| 2022/0150929 A1* | 5/2022 | Matsumura | H04W 72/1273 |
| 2022/0224465 A1* | 7/2022 | Li | H04L 5/0094 |

FOREIGN PATENT DOCUMENTS

| | | | | |
|---|---|---|---|---|
| CN | 111212437 A | 5/2020 | | |
| EP | 3582426 A1 | 12/2019 | | |
| WO | WO-2019066618 A1 * | 4/2019 | ............... | H04B 7/01 |
| WO | 2019099659 A1 | 5/2019 | | |

OTHER PUBLICATIONS

International Search Report (English and Chinese) and Written Opinion (Chinese) of the ISA issued in PCT/CN2021/081719, mailed Jun. 24, 2021; ISA/CN, 11 pages.
1 Extended European Search Report issued in European Patent Application No. 21744032.0, dated Oct. 9, 2023.

\* cited by examiner

METHOD AND APPARATUS FOR DETERMINING PDSCH RECEPTION BEAM, STORAGE MEDIUM, AND TERMINAL

CROSS-REFERENCE TO RELATED APPLICATIONS

This application is a National Stage of International Application No. PCT/CN2021/081719, filed on Mar. 19, 2021, which claims priority to Chinese Patent Application No. 202010074010.5, filed on Jan. 22, 2020, both of which are incorporated herein.

TECHNICAL FIELD

The present disclosure generally relates to communication technology field, and more particularly, to a method and apparatus for determining a Physical Downlink Share Channel (PDSCH) reception beam, a storage medium, and a terminal.

BACKGROUND

In high frequency band scenarios, according to New Radio (NR) standards, a base station and a terminal determine an optimal transmission and reception beam through a beam training process, so as to use the optimal transceiver beam to improve transmission reliability of uplink and downlink signals. During the beam training process, the terminal saves a reception beam corresponding to each reported transmission beam. In a process of scheduling a PDSCH by a Physical Downlink Control Channel (PDCCH), a TCI field carried in the PDCCH indicates transmission beam information of the PDSCH. The terminal obtains an appropriate reception beam based on the transmission beam information.

At present, the standards merely support that each PDCCH independently schedules different PDSCHs to send downlink data, but do not support multiple PDCCHs to schedule a same PDSCH. To improve transmission reliability of PDCCH, in a researching stage of the 3GPP new radio release 16 (Rel-16), a method of using PDCCH repeated transmission to improve reliability of PDCCH is discussed.

SUMMARY

In embodiments of present disclosure, a method and apparatus for determining a PDSCH reception beam, a storage medium, and a terminal are provided, which may enable the terminal to be capable of determining a transmission and reception beam adopted by each PDSCH, and improve consistency and accuracy in understanding of PDSCH transmission and reception beams by a base station and the terminal, thereby increasing a success rate of PDSCH reception.

In an embodiment of the present disclosure, a method for determining a PDSCH reception beam is provided, including: receiving one or more PDCCHs and determining a to-be-received PDSCH, wherein the to-be-received PDSCH is repeatedly scheduled by the one or more PDCCHs; determining a duration between a last symbol of the one or more PDCCHs which schedule the to-be-received PDSCH and a first symbol of the to-be-received PDSCH; using a first reception beam to receive the to-be-received PDSCH based on the duration being shorter than a preset duration; and using a second reception beam to receive the to-be-received PDSCH based on the duration being longer than or equal to the preset duration, wherein the first reception beam and the second reception beam are the same or different.

In an embodiment of the present disclosure, a storage medium having computer instructions stored therein is provided, wherein when the computer instructions are executed, the above method for determining the PDSCH reception beam is performed.

In an embodiment of the present disclosure, a terminal including a memory and a processor is provided, wherein the memory has computer instructions stored therein, and when the processor executes the computer instructions, the above method for determining the PDSCH reception beam is performed.

DETAILED DESCRIPTION

As described in the background, at present, the standards merely support that each PDCCH independently schedules different PDSCHs to send downlink data, but do not support multiple PDCCHs to schedule a same PDSCH. To improve transmission reliability of PDCCH, in a researching stage of the 3GPP Rel-16, a method of using PDCCH repeated transmission to improve reliability of PDCCH is discussed.

Specifically, in a discussion process of the NR Rel-16, there are following three ways of scheduling PDSCH by repeated transmission of PDCCH. It is assumed that N>1 PDCCHs are repeatedly sent to schedule M≥1 PDSCHs, where the M PDSCHs carry same downlink data.

Way 1: each PDCCH schedules a PDSCH different from others, and M=N.

Way 2: each PDCCH schedules K untransmitted PDSCHs, and 1≤K≤M.

Way 3: each PDCCH schedules M same PDSCHs, that is, K=M.

However, inventors found based on researches that in the NR Rel-16, PDCCH repeated transmission is not standardized, and there is no method for determining a transmission and reception beam adopted by each PDSCH. Therefore, the terminal cannot determine a transmission and reception beam adopted by each PDSCH when the PDSCH is scheduled in a manner of PDCCH repeated transmission, and consistency and accuracy of transmission and reception beams determined by the base station and the terminal are relatively low.

In embodiments of the present disclosure, one or more PDCCHs are received and a to-be-received PDSCH is determined, wherein the to-be-received PDSCH is repeatedly scheduled by the one or more PDCCHs. A duration between a last symbol of the one or more PDCCHs which schedule the to-be-received PDSCH and a first symbol of the to-be-received PDSCH is determined. A first reception beam is used to receive the to-be-received PDSCH based on the duration being shorter than a preset duration, and a second reception beam is used to receive the to-be-received PDSCH based on the duration being longer than or equal to the preset duration, wherein the first reception beam and the second reception beam are the same or different. With the above solutions, to the to-be-received PDSCH repeatedly scheduled by the one or more PDCCHs, by determining the duration between the last symbol of the one or more PDCCHs which schedule the to-be-received PDSCH and the first symbol of the to-be-received PDSCH, and comparing the duration with the preset duration, the first reception beam or the second reception beam is used to receive the to-be-received PDSCH, which may enable the terminal to be capable of determining a transmission and reception beam adopted by each PDSCH, and improve consistency and accuracy in understanding of PDSCH transmission and reception beams by the base station and the terminal, thereby increasing a success rate of PDSCH reception.

In order to clarify the objects, characteristics and advantages of the disclosure, embodiments of present disclosure will be described in detail in conjunction with accompanying drawings.

Figure 1:
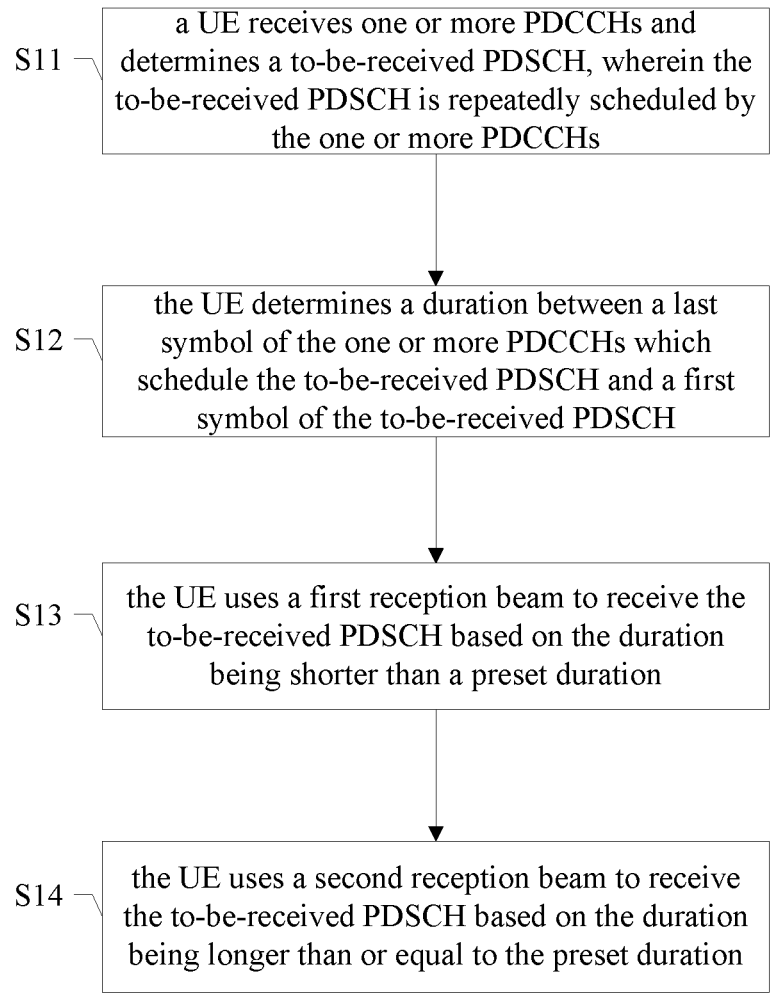
FIG. 1 is a flow chart of a method for determining a PDSCH reception beam according to an embodiment.

FIG. 1 is a flow chart of a method for determining a PDSCH reception beam according to an embodiment. Referring to FIG. 1, the method includes S11 to S14.

In S11, a UE receives one or more PDCCHs and determines a to-be-received PDSCH, wherein the to-be-received PDSCH is repeatedly scheduled by the one or more PDCCHs.

In S12, the UE determines a duration between a last symbol of the one or more PDCCHs which schedule the to-be-received PDSCH and a first symbol of the to-be-received PDSCH.

In S13, the UE uses a first reception beam to receive the to-be-received PDSCH based on the duration being shorter than a preset duration.

In S14, the UE uses a second reception beam to receive the to-be-received PDSCH based on the duration being longer than or equal to the preset duration.

The first reception beam and the second reception beam are the same or different.

It could be understood that, in some embodiments, the method may be implemented in a form of a software program which runs in a processor integrated inside a chip or a chip module.

In some embodiments, in S11, the UE receives one or more PDCCHs and determines the to-be-received PDSCH.

Specifically, in a process of scheduling the PDSCH by the one or more PDCCHs, PDSCH transmission follows PDCCH transmission. As mentioned above, to improve reliability of PDCCH transmission, a way of PDCCH repeated transmission may be adopted.

In some embodiments, in the process of scheduling PDSCH by the one or more PDCCHs, a TCI field carried in the by the one or more PDCCHs indicates transmission beam information of the PDSCH, and the terminal can obtain an appropriate reception beam based on the transmission beam information. As processes such as reception and decoding of the PDCCHs take time, according to the NR standards, when a duration between the last symbol of the one or more PDCCHs and the first symbol of the PDSCH is shorter than a threshold, the base station uses a default beam to send the PDSCH, and the terminal uses the default beam to receive the PDSCH.

In some embodiments, in S12, the duration between the last symbol of the one or more PDCCHs which schedule the PDSCH and the first symbol of the PDSCH may be determined in different ways according to various ways of PDDCH repeated transmission.

In some embodiments, each of the one or more PDCCHs schedules a single PDSCH to send same downlink data, and different PDCCHs schedule different PDSCHs.

Specifically, it is assumed that N>1 PDCCHs are repeatedly transmitted to schedule M≥1 PDSCHs, where the M PDSCHs carry the same downlink data. That is, each PDCCH schedules a PDSCH different from others, and M=N.

Figure 2:
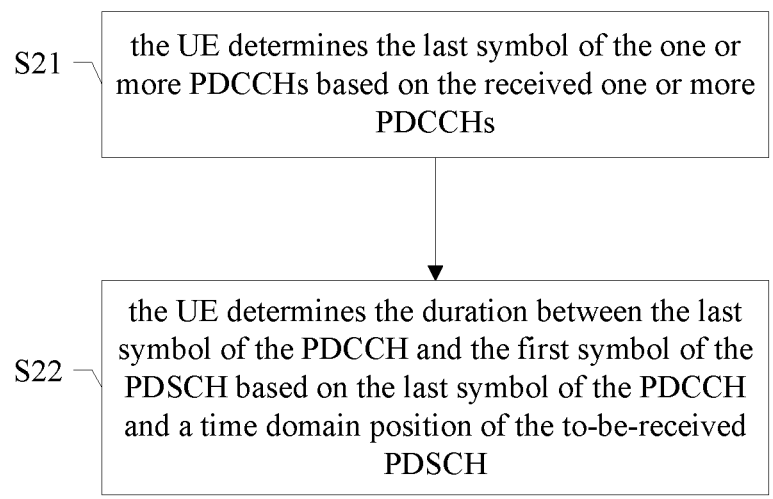
FIG. 2 is a flow chart of S12 as shown in FIG. 1 according to an embodiment.

Referring to FIG. 2, FIG. 2 is a flow chart of S12 as shown in FIG. 1 according to an embodiment. Said determining the duration between the last symbol of the PDCCH scheduling the PDSCH and the first symbol of the PDSCH may include S21 to S22 which are described below.

In S21, the UE determines the last symbol of the one or more PDCCHs based on the received one or more PDCCHs.

In some embodiments, as each PDCCH schedules a single PDSCH to send the same downlink data, the received PDCCH is the last PDCCH that schedules the PDSCH.

In S22, the UE determines the duration between the last symbol of the PDCCH and the first symbol of the PDSCH based on the last symbol of the PDCCH and a time domain position of the to-be-received PDSCH.

In some embodiments, the time domain position of the to-be-received PDSCH may be determined in a conventional manner, which is not limited in the embodiments of the present disclosure.

Figure 3:
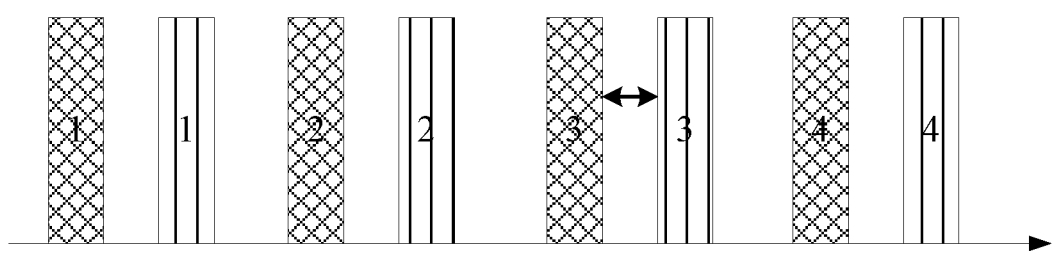
FIG. 3 is a diagram of a duration between a last symbol of a PDCCH and a first symbol of a PDSCH according to an embodiment.

Referring to FIG. 3, FIG. 3 is a diagram of the duration between the last symbol of the PDCCH and the first symbol of the PDSCH according to an embodiment.

As shown in FIG. 3, each PDCCH schedules a single PDSCH to transmit the same downlink data, for example, PDCCH (1) schedules PDSCH (1), PDCCH (2) schedules PDSCH (2), PDCCH (3) schedules PDSCH (3), and PDCCH (4) schedules PDSCH (4).

Taking PDSCH (3) as an example, an arrow as shown in FIG. 3 indicates the duration between the last symbol of PDCCH (3) and the first symbol of PDSCH (3).

In the above embodiments, each of the one or more PDCCHs schedules a single PDSCH to send same downlink data, and different PDCCHs schedule different PDSCHs. In this case, the last symbol of the one or more PDCCHs is determined based on the one or more received PDCCHs, and the duration between the last symbol of the one or more PDCCHs and the first symbol of the to-be-received PDSCH is further determined, so as to realize solutions of the present disclosure in a case that each of the one or more PDCCHs schedules a single PDSCH to send same downlink data.

In some embodiments, each of the one or more PDCCHs schedules one or more PDSCHs to send same downlink data, and different PDCCHs schedule not exactly the same PDSCHs.

Specifically, it is assumed that N>1 PDCCHs are repeatedly transmitted to schedule M≥1 PDSCHs, where the M PDSCHs carry the same downlink data. Each PDCCH schedules K PDSCHs that have not been transmitted, and 1≤K≤M.

Figure 4:
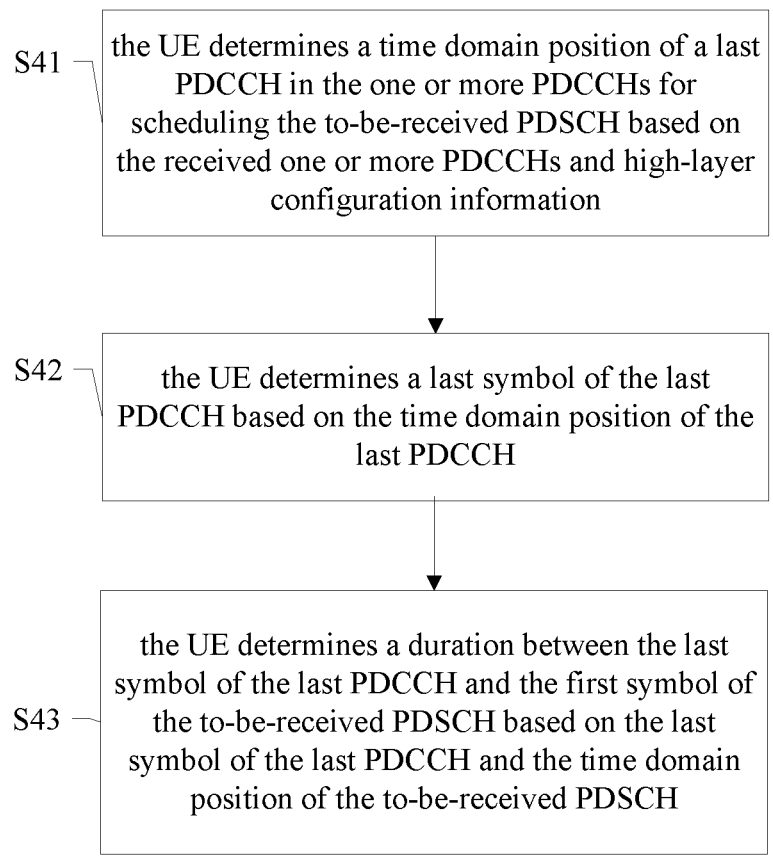
FIG. 4 is a flow chart of S12 as shown in FIG. 1 according to an embodiment.

Referring to FIG. 4, FIG. 4 is a flow chart of S12 as shown in FIG. 1 according to an embodiment. Said determining the duration between the last symbol of the PDCCH scheduling the PDSCH and the first symbol of the PDSCH may include S41 to S43 which are described below.

In S41, the UE determines a time domain position of a last PDCCH in the one or more PDCCHs for scheduling the to-be-received PDSCH based on the received one or more PDCCHs and high-layer configuration information.

In some embodiments, the high-layer configuration information may be acquired by the terminal through high-layer signaling, such as a Radio Resource Control (RRC) signaling, and may, for example, indicate which PDCCH is the last PDCCH.

In some embodiments, the time domain position of the to-be-received PDSCH may be determined in a conventional manner, which is not limited in the embodiments of the present disclosure.

In S42, the UE determines a last symbol of the last PDCCH based on the time domain position of the last PDCCH.

In S43, the UE determines a duration between the last symbol of the last PDCCH and the first symbol of the to-be-received PDSCH based on the last symbol of the last PDCCH and the time domain position of the to-be-received PDSCH.

Figure 5:
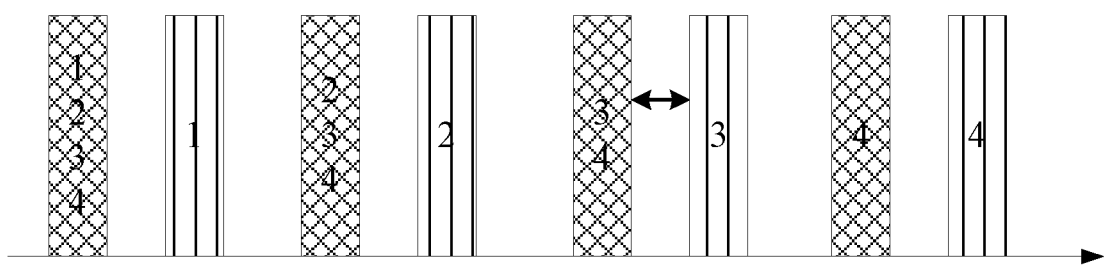
FIG. 5 is a diagram of a duration between a last symbol of a PDCCH and a first symbol of a PDSCH according to an embodiment.

Referring to FIG. 5, FIG. 5 is a diagram of the duration between the last symbol of the PDCCH and the first symbol of the PDSCH according to an embodiment.

As shown in FIG. 5, each PDCCH schedules one or more PDSCHs to send the same downlink data, and the PDSCHs scheduled by different PDCCHs are not exactly the same. For example, PDCCH (1) schedules PDSCH (1, 2, 3, 4), PDCCH (2) schedules PDSCH (2, 3, 4), PDCCH (3) schedules PDSCH (3, 4), and PDCCH (4) schedules PDSCH (4).

Taking PDSCH (3) as an example, an arrow as shown in FIG. 5 indicates the duration between the last symbol of PDCCH (3) used to schedule PDSCH (3, 4) and the first symbol of PDSCH (3).

In the above embodiments, each of the one or more PDCCHs schedules one or more PDSCHs to send same downlink data, and different PDCCHs schedule not exactly the same PDSCHs. In this case, the time domain position of the last PDCCH in the one or more PDCCHs for scheduling the to-be-received PDSCH is determined based on the received one or more PDCCHs and high-layer configuration information, the last symbol of the last PDCCH is determined, and the duration between the last symbol of the last PDCCH and the first symbol of the to-be-received PDSCH is further determined, so as to realize solutions of the present disclosure in a case that each of the one or more PDCCHs schedules a non-fixed number of PDSCHs.

In some embodiments, each of the one or more PDCCHs schedules one or more PDSCHs to send same downlink data, and different PDCCHs schedule the same PDSCHs.

Specifically, it is assumed that N>1 PDCCHs are repeatedly transmitted to schedule M≥1 PDSCHs, where the M PDSCHs carry the same downlink data. Each PDCCH schedules M same PDSCHs, i.e., K=M.

Figure 6:
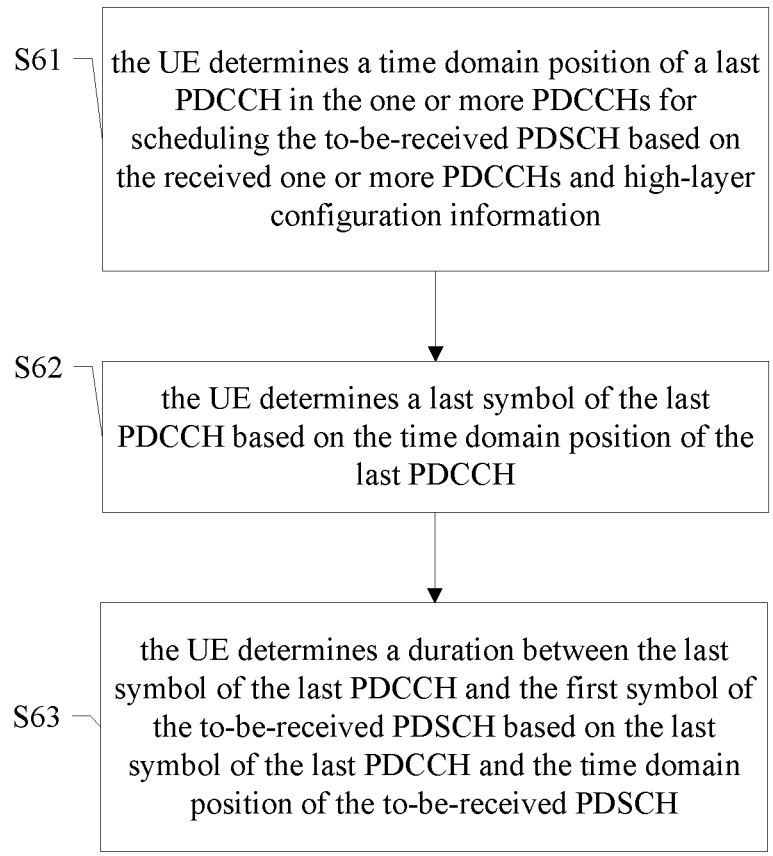
FIG. 6 is a flow chart of S12 as shown in FIG. 1 according to an embodiment.

Referring to FIG. 6, FIG. 6 is a flow chart of S12 as shown in FIG. 1 according to an embodiment. Said determining the duration between the last symbol of the PDCCH scheduling the PDSCH and the first symbol of the PDSCH may include S61 to S63 which are described below.

In S61, the UE determines a time domain position of a last PDCCH in the one or more PDCCHs for scheduling the to-be-received PDSCH based on the received one or more PDCCHs and high-layer configuration information.

In some embodiments, the high-layer configuration information may be acquired by the terminal through high-layer signaling, such as an RRC signaling, and may, for example, indicate which PDCCH is the last PDCCH.

In some embodiments, the time domain position of the to-be-received PDSCH may be determined in a conventional manner, which is not limited in the embodiments of the present disclosure.

In S62, the UE determines a last symbol of the last PDCCH based on the time domain position of the last PDCCH.

In S63, the UE determines a duration between the last symbol of the last PDCCH and the first symbol of the to-be-received PDSCH based on the last symbol of the last PDCCH and the time domain position of the to-be-received PDSCH.

Figure 7:
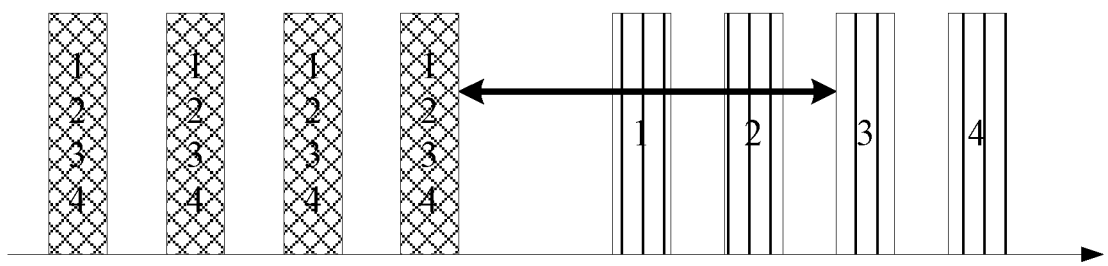
FIG. 7 is a diagram of a duration between a last symbol of a PDCCH and a first symbol of a PDSCH according to an embodiment.

Referring to FIG. 7, FIG. 7 is a diagram of the duration between the last symbol of the PDCCH and the first symbol of the PDSCH according to an embodiment.

As shown in FIG. 7, each PDCCH schedules one or more PDSCHs to send the same downlink data, and the PDSCHs scheduled by different PDCCHs are the same. For example, PDCCH (1) schedules PDSCH (1, 2, 3, 4), PDCCH (2) schedules PDSCH (1, 2, 3, 4), PDCCH (3) schedules PDSCH (1, 2, 3, 4), and PDCCH (4) schedules PDSCH (1, 2, 3, 4).

Taking PDSCH (3) as an example, an arrow as shown in FIG. 7 indicates the duration between the last symbol of PDCCH (3) used to schedule PDSCH (1, 2, 3, 4) and the first symbol of PDSCH (3).

In the above embodiments, each of the one or more PDCCHs schedules one or more PDSCHs to send same downlink data, and different PDCCHs schedule the same PDSCHs. In this case, the time domain position of the last PDCCH in the one or more PDCCHs for scheduling the to-be-received PDSCH is determined based on the received one or more PDCCHs and high-layer configuration information, the last symbol of the last PDCCH is determined, and the duration between the last symbol of the last PDCCH and the first symbol of the to-be-received PDSCH is further determined, so as to realize solutions of the present disclosure in a case that each of the one or more PDCCHs schedules a non-fixed number of PDSCHs.

Still referring to FIG. 1, in some embodiments, in S13, based on the duration being shorter than the preset duration, the UE may receive the PDSCH by using the first reception beam.

Further, the first reception beam may be predefined.

Specifically, the first reception beam may be predefined by a standard, such as a default beam.

In the embodiments, by setting the first reception beam to be predefined, accuracy and consistency of determining the same beam by a transmitter and a receiver may be improved, which is conducive to improving transceiving performance.

In some embodiments, in S14, if the duration being longer than or equal to the preset duration, the UE may receive the PDSCH by using the second reception beam.

The first reception beam and the second reception beam are the same or different.

Further, scheduling information of the to-be-received PDSCH carried in the one or more PDCCHs that schedule the to-be-received PDSCH includes TCI indication information, is determined by decoding the one or more PDCCHs, and indicates the to-be-received PDSCH. Said using a second reception beam to receive the to-be-received PDSCH includes: using a reception beam corresponding to a transmission beam of the to-be-received PDSCH indicated by the TCI indication information as the second reception beam to receive the to-be-received PDSCH.

In the above embodiments, said using a second reception beam to receive the to-be-received PDSCH includes: using a reception beam corresponding to a transmission beam of the to-be-received PDSCH indicated by the TCI indication information as the second reception beam to receive the to-be-received PDSCH. In this manner, when the duration between the last symbol of the last PDCCH and the first symbol of the to-be-received PDSCH is relatively long, there is an opportunity to use the second reception beam. Besides, the terminal is capable of keeping consistent with the base station, and accuracy of beam determination is improved.

Further, the preset duration is determined based on processing capability of the UE and reported to a base station.

In the above embodiments, the preset duration is determined based on processing capability of the UE and reported by the UE to the base station, which may improve accuracy and adaptability of the determination of the preset duration, thereby further improving transceiving performance.

In the embodiments of the present disclosure, to the to-be-received PDSCH repeatedly scheduled by the one or more PDCCHs, by determining the duration between the last symbol of the one or more PDCCHs which schedule the to-be-received PDSCH and the first symbol of the to-be-received PDSCH, and comparing the duration with the preset duration, the first reception beam or the second reception beam is used to receive the to-be-received PDSCH, which may enable the terminal to be capable of determining a transmission and reception beam adopted by each PDSCH, and improve consistency and accuracy in understanding of PDSCH transmission and reception beams by the base station and the terminal, thereby increasing a success rate of PDSCH reception.

Figure 8:
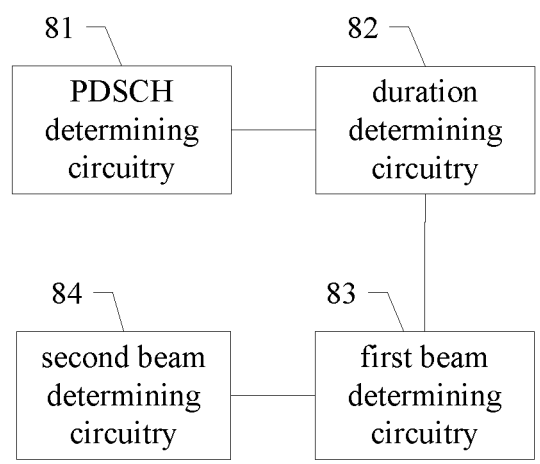
FIG. 8 is a structural diagram of an apparatus for determining a PDSCH reception beam according to an embodiment.

Referring to FIG. 8, FIG. 8 is a structural diagram of an apparatus for determining a PDSCH reception beam according to an embodiment. The apparatus includes a PDSCH determining circuitry 81, a duration determining circuitry 82, a first beam determining circuitry 83 and a second beam determining circuitry 84.

The PDSCH determining circuitry 81 is configured to receive one or more PDCCHs and determine a to-be-received PDSCH, wherein the to-be-received PDSCH is repeatedly scheduled by the one or more PDCCHs.

The duration determining circuitry 82 is configured to determine a duration between a last symbol of the one or more PDCCHs which schedule the to-be-received PDSCH and a first symbol of the to-be-received PDSCH.

The first beam determining circuitry 83 is configured to use a first reception beam to receive the to-be-received PDSCH based on the duration being shorter than a preset duration.

The second beam determining circuitry 84 is configured to use a second reception beam to receive the to-be-received PDSCH based on the duration being longer than or equal to the preset duration.

The first reception beam and the second reception beam are the same or different.

In some embodiments, the above apparatus may correspond to a chip with a data processing function in a UE, such as a baseband chip, or a chip module having a chip with a data processing function in a UE.

In the embodiments of the present disclosure, to the to-be-received PDSCH repeatedly scheduled by the one or more PDCCHs, by determining the duration between the last symbol of the one or more PDCCHs which schedule the to-be-received PDSCH and the first symbol of the to-be-received PDSCH, and comparing the duration with the preset duration, the first reception beam or the second reception beam is used to receive the to-be-received PDSCH, which may enable the terminal to be capable of determining a transmission and reception beam adopted by each PDSCH, and improve consistency and accuracy in understanding of PDSCH transmission and reception beams by the base station and the terminal, thereby increasing a success rate of PDSCH reception.

More details on principles, implementations and advantages of the apparatus may be referred to relevant descriptions of the method as mentioned above and illustrated in FIGS. 1 to 7, which are not repeated here.

In an embodiment of the present disclosure, a storage medium having computer instructions stored therein is provided, wherein when the computer instructions are executed, the above method for determining a PDSCH reception beam is performed. In some embodiments, the storage medium may be a computer readable storage medium, and may include a non-volatile or a non-transitory memory, or include an optical disk, a hard disk drive or a solid state disk.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including a memory and a processor is provided, wherein the memory has computer instructions stored therein, and when the processor executes the computer instructions, the above method for determining a PDSCH reception beam is performed. The terminal includes but is not limited to a mobile phone, a computer or a tablet computer.

The terminal in the embodiments of the present disclosure may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

Modules/units included in each apparatus and product described in the above embodiments may be software modules/units, hardware modules/units, or a combination of software modules/units and hardware modules/units. For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for determining a Physical Downlink Share Channel (PDSCH) reception beam, comprising:
    receiving one or more Physical Downlink Control Channels (PDCCHs) and determining a to-be-received PDSCH, wherein the to-be-received PDSCH is repeatedly scheduled by the one or more PDCCHs;
    determining a duration between a last symbol of the one or more PDCCHs which schedule the to-be-received PDSCH and a first symbol of the to-be-received PDSCH;
    using a first reception beam to receive the to-be-received PDSCH based on the duration being shorter than a preset duration; and
    using a second reception beam to receive the to-be-received PDSCH based on the duration being longer than or equal to the preset duration;
    wherein each of the one or more PDCCHs schedules one or more PDSCHs to send same downlink data, and different PDCCHs schedule same PDSCHs; and said determining a duration between a last symbol of the one or more PDCCHs which schedule the to-be-received PDSCH and a first symbol of the to-be-received PDSCH comprises:
        determining a time domain position of a last PDCCH in the one or more PDCCHs for scheduling the to-be-received PDSCH based on the received one or more PDCCHs and high-layer configuration information;
        determining a last symbol of the last PDCCH based on the time domain position of the last PDCCH; and
        determining a duration between the last symbol of the last PDCCH and the first symbol of the to-be-received PDSCH based on the last symbol of the last PDCCH and the time domain position of the to-be-received PDSCH.

2. The method according to claim 1, wherein the first reception beam is predefined.

3. The method according to claim 1, wherein the preset duration is determined based on processing capability of a terminal and reported to a base station.

4. The method according to claim 1, wherein scheduling information of the to-be-received PDSCH carried in the one or more PDCCHs that schedule the to-be-received PDSCH comprises TCI indication information, is determined by decoding the one or more PDCCHs, and indicates the to-be-received PDSCH;
    said using a second reception beam to receive the to-be-received PDSCH comprises:
    using a reception beam corresponding to a transmission beam of the to-be-received PDSCH indicated by the TCI indication information as the second reception beam to receive the to-be-received PDSCH.

5. A non-transitory storage medium storing one or more programs, the one or more programs comprising computer instructions, which, when executed by a processor, cause the processor to:
    receive one or more Physical Downlink Control Channels (PDCCHs) and determining a to-be-received Physical Downlink Share Channel (PDSCH), wherein the to-be-received PDSCH is repeatedly scheduled by the one or more PDCCHs;
    determine a duration between a last symbol of the one or more PDCCHs which schedule the to-be-received PDSCH and a first symbol of the to-be-received PDSCH;
    use a first reception beam to receive the to-be-received PDSCH based on the duration being shorter than a preset duration; and
    use a second reception beam to receive the to-be-received PDSCH based on the duration being longer than or equal to the preset duration;
    wherein each of the one or more PDCCHs schedules one or more PDSCHs to send same downlink data, and different PDCCHs schedule same PDSCHs; and said determining a duration between a last symbol of the one or more PDCCHs which schedule the to-be-received PDSCH and a first symbol of the to-be-received PDSCH comprises:
        determining a time domain position of a last PDCCH in the one or more PDCCHs for scheduling the to-be-received PDSCH based on the received one or more PDCCHs and high-layer configuration information;
        determining a last symbol of the last PDCCH based on the time domain position of the last PDCCH; and
        determining a duration between the last symbol of the last PDCCH and the first symbol of the to-be-received PDSCH based on the last symbol of the last PDCCH and the time domain position of the to-be-received PDSCH.

6. A terminal comprising a memory and a processor, wherein the memory stores one or more programs, the one or more programs comprising computer instructions, which, when executed by the processor, cause the processor to:

receive one or more Physical Downlink Control Channels (PDCCHs) and determining a to-be-received Physical Downlink Share Channel (PDSCH), wherein the to-be-received PDSCH is repeatedly scheduled by the one or more PDCCHs;

determine a duration between a last symbol of the one or more PDCCHs which schedule the to-be-received PDSCH and a first symbol of the to-be-received PDSCH;

use a first reception beam to receive the to-be-received PDSCH based on the duration being shorter than a preset duration; and use a second reception beam to receive the to-be-received PDSCH based on the duration being longer than or equal to the preset duration;

wherein each of the one or more PDCCHs schedules one or more PDSCHs to send same downlink data, and different PDCCHs schedule same PDSCHs; and said determining a duration between a last symbol of the one or more PDCCHs which schedule the to-be-received PDSCH and a first symbol of the to-be-received PDSCH comprises:

determining a time domain position of a last PDCCH in the one or more PDCCHs for scheduling the to-be-received PDSCH based on the received one or more PDCCHs and high-layer configuration information;

determining a last symbol of the last PDCCH based on the time domain position of the last PDCCH; and determining a duration between the last symbol of the last PDCCH and the first symbol of the to-be-received PDSCH based on the last symbol of the last PDCCH and the time domain position of the to-be-received PDSCH.

7. The terminal according to claim 6, wherein the first reception beam is predefined.

8. The terminal according to claim 6, wherein the preset duration is determined based on processing capability of a terminal and reported to a base station.

9. The terminal according to claim 6, wherein scheduling information of the to-be-received PDSCH carried in the one or more PDCCHs that schedule the to-be-received PDSCH comprises TCI indication information, is determined by decoding the one or more PDCCHs, and indicates the to-be-received PDSCH;

said using a second reception beam to receive the to-be-received PDSCH comprises:

using a reception beam corresponding to a transmission beam of the to-be-received PDSCH indicated by the TCI indication information as the second reception beam to receive the to-be-received PDSCH.

10. The non-transitory storage medium according to claim 5, wherein the first reception beam is predefined.

11. The non-transitory storage medium according to claim 5, wherein the preset duration is determined based on processing capability of a terminal and reported to a base station.

* * * * *